Patented Mar. 10, 1925.

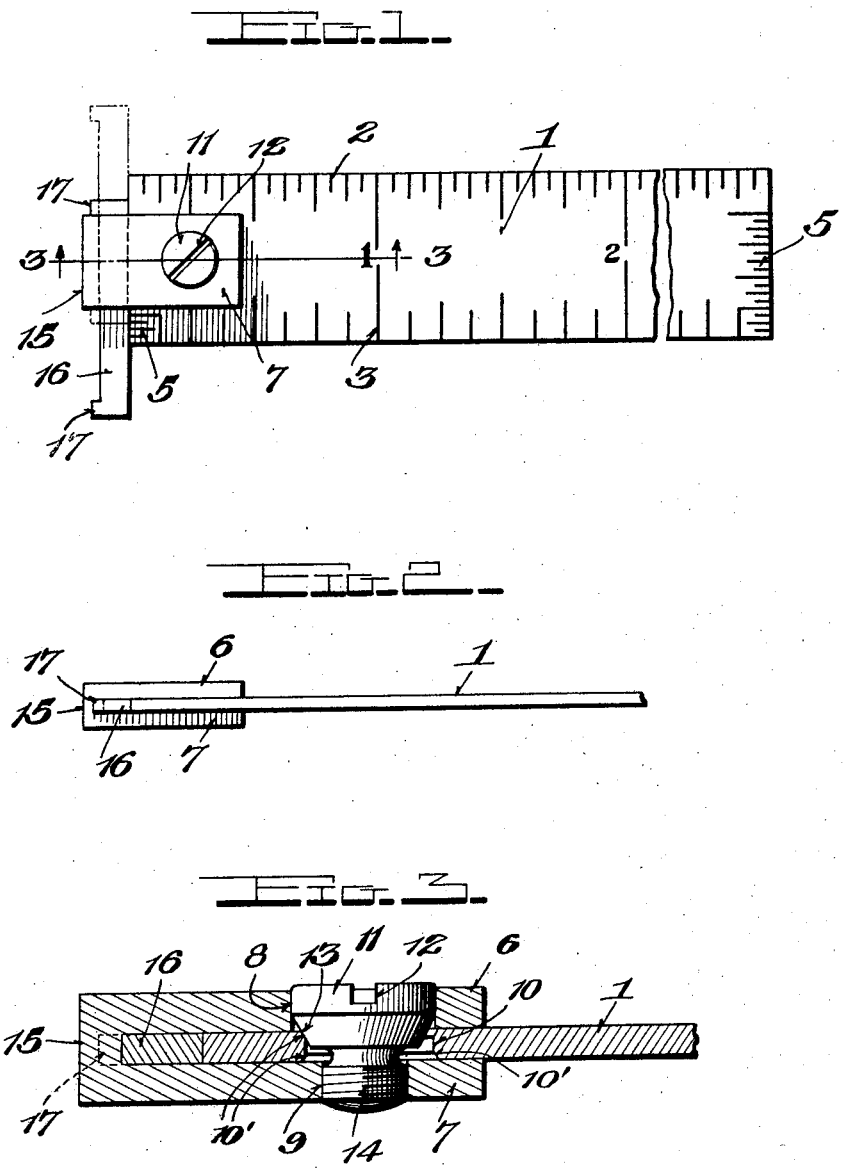

1,529,210

UNITED STATES PATENT OFFICE.

JOHN W. PARKER, OF BARRINGTON, RHODE ISLAND, ASSIGNOR TO BROWN & SHARPE MANUFACTURING COMPANY, OF PROVIDENCE, RHODE ISLAND.

HOOK RULE.

Application filed December 15, 1923. Serial No. 680,940.

*To all whom it may concern:*

Be it known that I, JOHN W. PARKER, a citizen of the United States, residing at Barrington, in the county of Bristol and State of Rhode Island, have invented new and useful Improvements in Hook Rules, of which the following is a specification.

This invention relates to certain new and useful improvements in hook rules, and has for its primary object means for movably attaching a hook or the like to the end of a rule for taking measurements, through a hole, and with the hook disposed sufficiently inwardly beyond the adjacent edge of the rule to enable calipering.

A further object of the invention is to provide a reversible hook, or one having similar ends which are interchangeable.

The invention further aims to provide a rule in which the hook can be readily removed and the rule used as a standard rule, and one wherein no loose parts subject to loss are employed.

Still further the invention aims to provide a hook attachment which allows of reading of all four edges of the rule.

Further and other objects will be later set forth and manifested in the course of the following description.

In the drawings:—

Figure 1 is a plan view of the invention.

Figure 2 is a top edge elevation, and

Figure 3, is an enlarged section on line 3—3 of Figure 1.

In proceeding in accordance with the present invention a rule 1 is employed of the standard steel rule type and is provided on its longitudinal edge portions with graduations 2 and 3 and along its end edge portions with similar graduations 4 and 5.

The attachment embodies a substantially U-shaped clip, or body having arms 6 and 7 which latter embrace opposite sides of the rule and are formed with apertures 8 and 9 which latter register with an aperture 10 formed in the end portion of the rule. The circumferential edges of the walls of the aperture 10 are beveled as indicated at 10′. The aperture 8 of the clip is of a diameter in excess of that of the aperture 10 of the rule while the aperture 9 of the clip is threaded.

A single fastening screw 11 is employed to secure the parts in attached position on the rule and has a slotted head 12, a beveled portion 13 and a threaded end 14 of reduced diameter. The end 14 of the screw threadedly engages in the threaded aperture 9 of the rule 2, while the head engages in the aperture 8 and the bevelled portion 13 acts as a cam or wedge engaging the beveled circumferential edge 10′ of the aperture 10, so as to afford a tight frictional locking contact therewith.

The closed end 15 of the clip is, when in attached position on the rule, disposed in spaced relation to the adjacent end edge of the rule and receives the body or shank 16 of a double-ended hook member therein. The hooks proper 17 of the hook member are similar, and consequently interchangeable. The arms 6 and 7 embrace opposite sides of the shank 16 therebetween and upon tightening of the fastening screw effect a tight clamping action on the shank so as to hold the latter stationary and in any position to which the shank may be adjusted.

It will thus be noted that the hook member is readily reversible and even though the screw may work loose and the hook member be thus released from the clamping action of the arms 6 and 7 of the clip, it cannot be separated from the rule without prior removal of the clip. The shank of the hook engages the end edge of the rule and the closed end of the clip holds the parts against turning movements, while the hooks engage the clip and cannot be disengaged from the rule except by removal of the clip.

The rule may be employed for measuring diameters of flanges or circular pieces; through the hubs of pulleys setting calipers and dividers and work of similar character. The hook lies inwardly beyond the upper edge of the rule permitting the use of outside calipers in taking the measurement, one point of the calipers resting on the hook.

Having thus described my invention, what I claim as new and desire to secure by Letters Patent is:—

1. An attachment for rules, including in combination with a rule having an aperture adjacent one end thereof the circumferential edge of which is beveled, a substantially U-shaped clip the arms of which embrace opposite sides of said end of the rule therebetween, said clip arms having apertures of relatively varying diameters respectively registering with the rule aperture the aperture of the clip arms of least diameter being interiorly threaded, a hook member including a shank engaged between the closed end of the clip and the adjacent end edge of the rule and having a hook on each end, and a screw in the said registering apertures having a head in the larger aperture and a reduced end threaded into the smaller aperture of the clip and having a beveled portion engaged with the beveled circumferential edge of the aperture of the rule.

2. An attachment for rules, including in combination with a rule having an aperture adjacent one end thereof, a substantially U-shaped clip the arms of which embrace opposite sides of said end of the rule therebetween said clip arms having apertures registering with the rule aperture, a hook member including a shank engaged between the closed end of the clip and the adjacent end edge of the rule and having a hook on each end, and a screw in the registering apertures having an end threaded into one of the clip apertures and having a beveled part engaged with the wall of the aperture of the rule.

3. In combination with a rule, a hook having a shank, a U-clip embracing the shank and an end of the rule, the rule and arms of the clip having registering apertures and a screw engaged through the apertures and having a beveled part engaging the peripheral wall of the rule aperture and having a part threaded into the aperture of one of the clip arms.

4. In combination with a rule, a hook engaged on one side edge with and adjustable along an end edge of the rule, a clip engaged with the opposite side edge of the hook and with the opposed side faces of the rule, and a single screw for connecting the clip to the rule and to clamp the hook against movement.

5. In combination with a rule, a member having a hook on each end thereof, said member having a side edge thereof engaged with and adjustable along an end edge of the rule, a clip engaged with the opposite side edge of the member and with the opposed side faces of the rule, the member having its hooks engageable with opposite sides of the clip so as to limit adjustment thereof in both directions, and a single screw for connecting the clip to the rule and for clamping the member in adjusted position.

6. In combination with a rule, a member having a hook on each end thereof, said member having a side edge thereof engaged with and adjustable along an end edge of the rule, a clip engaged with the opposite side edge of the member and with the opposed side faces of the rule, the member having its hooks engageable with opposite sides of the clip so as to limit adjustment thereof in directions transversely of the rule, and means for securing the clip to the rule whereby to hold the member fixed in adjusted position.

7. In combination with a rule, a member having a side edge slidably engaged with an end edge of the rule so as to be adjustable transversely of the rule, a hook on each end of said member extending outwardly from its opposite side edge, and means to adjustably secure the member to the rule in adjusted position.

In testimony whereof I have signed my name to this specification in the presence of two subscribing witnesses.

JOHN W. PARKER.

Witnesses:
S. N. BARRY,
J. A. MILLER.